René Berny, Jacques Coppé, & Georges Tavernier, Inventors

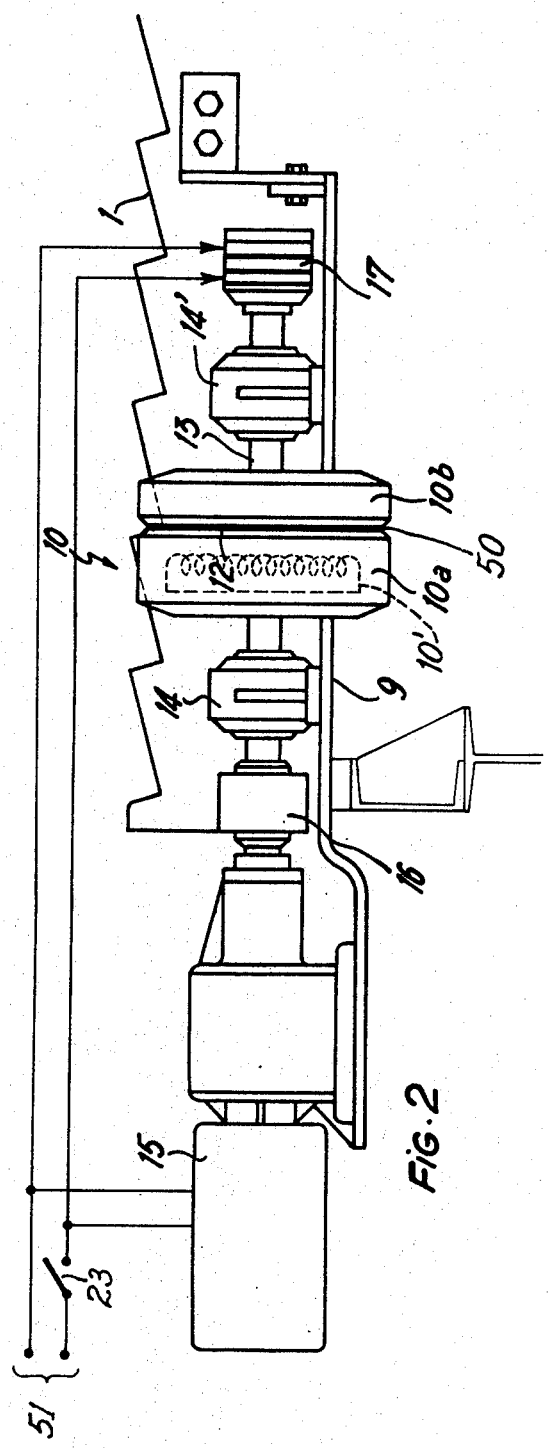
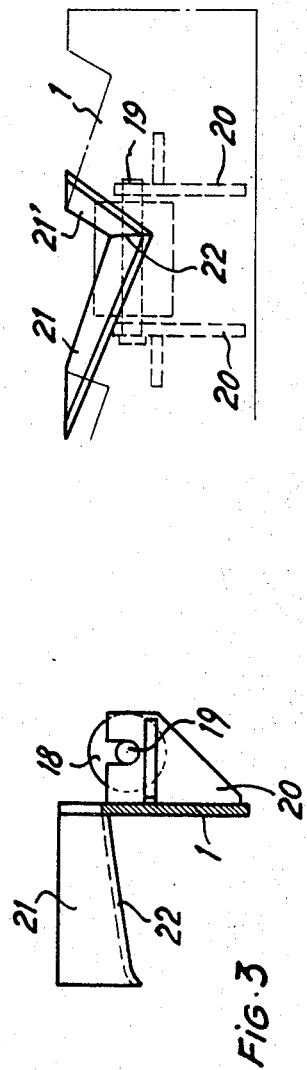
FIG. 2
FIG. 3
FIG. 4

United States Patent Office 3,529,758
Patented Sept. 22, 1970

3,529,758
DEVICE FOR ALIGNING PRODUCTS OF CONSIDERABLE LENGTH, MORE PARTICULARLY HOT-ROLLED PRODUCTS
René Berny, Maubeuge, Jacques Coppe, Grande-Synthe, and Georges Tavernier, Maubeuge, France, assignors to Société dite: Usinor, Paris, France, a company of France
Filed Oct. 2, 1967, Ser. No. 672,183
Claims priority, application France, Sept. 30, 1966, 78,436
Int. Cl. B65h 17/22
U.S. Cl. 226—93                              2 Claims

ABSTRACT OF THE DISCLOSURE

Device for the longitudinal conveyance of elongated products made of ferromagnetic material, such as steel bars, sections and the like, said device comprising a roller made of ferromagnetic material, a motor for driving said roller in rotational movement, a coil carried by said roller, and means for supplying said coil with electrical direct current, whereby the said roller behaves like a rotary electromagnet. An installation for aligning products of considerable length and, more particularly, hot-rolled products, when the latter are cooled being sheared comprising the said device with idler wheels aligned longitudinally to support the said product driven in translational movement by the said roller.

---

Figure 1:
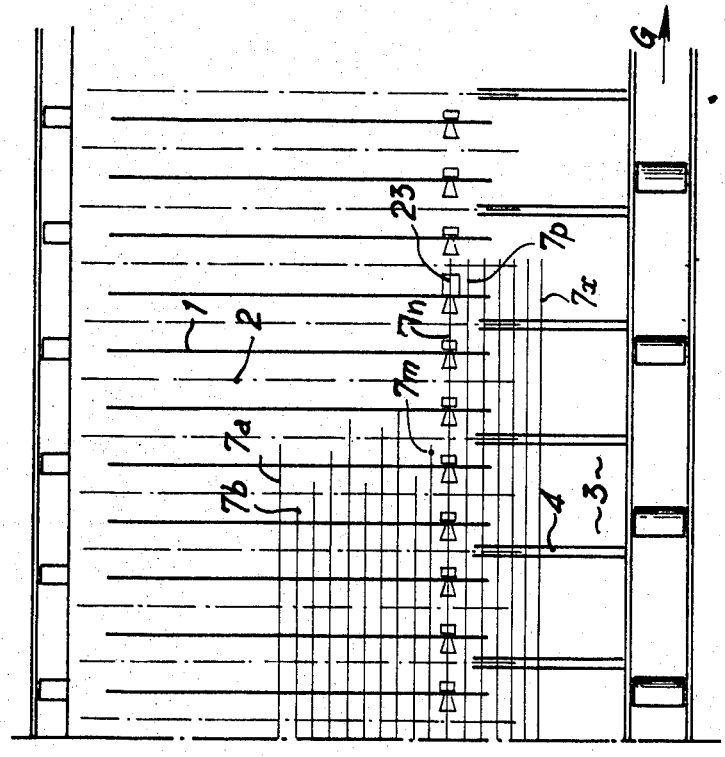
Figure 1:
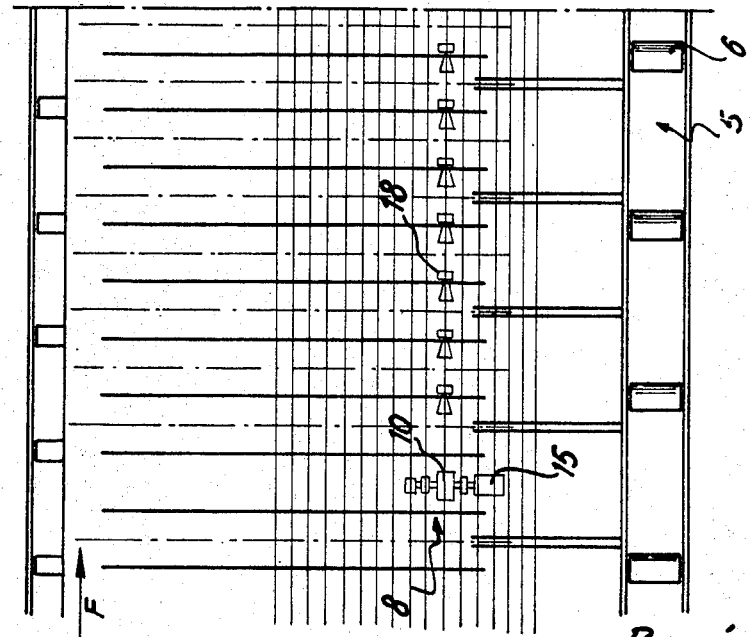

The present invention concerns a device permitting the alignment of products of considerable length and, more particularly, hot-rolled products when the latter are cooled before being cut by shears.

Thus, for example, in the production of steel bars or other sections, the products are discharged from the rolling mill on to a cooling apparatus where they are cooled separately, side by side, before being grouped in flat clusters to be sheared to specific lengths. Now, it is found that neither the heads nor the tails of the products are aligned and that, furthermore, the head alignment irregularity does not correspond to the tail alignment irregularity. In other words, the scatter of alignments has a double cause: on the one hand a difference in length of the products and on the other hand irregularities in the positioning of the products on the cooling apparatus.

In fact, during rolling, the lengths of the products arriving at the cooling apparatus are rarely equal since they are influenced by the distribution of the weight of the semi-finished products, the lopping process carried out on the semi-finished products by the hot shears, and the tolerance conditions at the finished products, this in turn being connected with the fluctuations in the physical conditions of the rolling operation.

On the other hand, the variations in the positioning of the products on the cooling apparatus are due chiefly to the response times of the mechanical, pneumatic and electrical connections of the devices effecting the discharge of the products at the outlet side of the finishing stands of the rolling mill.

Defective alignment both at the head and at the tail of the products constitutes a relatively considerable proportion of the gross amount of metal used in the production of the products, since the waste ends both at the heads and at the tails are considerable, whilst the calculation of the maximum number of first-quality products which can be cut in the group of products presented to the shears, is relatively difficult.

The present invention has as its object to provide a device whereby more particularly the disadvantages indicated hereinbefore can be remedied.

For this purpose, according to the invention the heads of the products are aligned by means of a roller made of ferromagnetic material capable of being driven in rotational movement by a suitable motor, and equipped with a coil which can be supplied with direct current, so that the said roller behaves like a rotary electromagnet capable of effecting the translational movement of each product to a position corresponding to the desired alignment.

In an advantageous form of embodiment, the roller is formed of two adjacent steel masses which are connected mechanically but insulated magnetically, for example by a brass separator disc, having, at the junction of the two masses, a groove intended to receive the products successively in such a manner that the closing of the magnetic field is effected by the products themselves when they come into contact with the two masses in lodging in the said groove.

The motor driving the roller in rotational movement is controlled electrically by a contact arranged in the vicinity of the position corresponding to the desired alignment and actuated by the head of the product for interrupting supply to the motor.

Furthermore, to facilitate the driving of the product by the roller, it is preferable to arrange idler wheels on which the product entrained by the rotation of the roller slides towards the alignment position.

The inexpensive device according to the invention makes it possible to align the heads of products satisfactorily, shifting all the irregularities due to the various causes of differences to the tail of the group. Furthermore, the work of the foreman is considerably simplified since the head waste ends resulting from the shearing of the products are substantially nil, and he can calculate easily the number of first-quality products which can be cut in the group being presented to the shears. Finally, the sorting-out of short products and waste ends has to be carried out only once per group instead of twice as previously, so that the cutting rate is also improved.

The additional description which follows with the accompanying drawings, which are given more especially by way of example, will make it easier to understand how the invention can be carried into effect.

In the drawings:
FIG. 1 is a general diagrammatic view showing part of a cooling apparatus equipped with a alignment device according to the invention;
FIG. 2 is a detail view in elevation of the roller device;
FIG. 3 is a detail view of a possible arrangement of idler wheels; and
FIG. 4 is a view of the device shown in FIG. 3 turned through 90°.

FIG. 1 shows diagrammatically in plan view a part of a cooling apparatus arranged between the outlet side of a rolling mill discharging hot elongated products, for example, bars as indicated by the arrow F, and a shears (not shown) receiving flat groups of cooled products as indicated at G.

On the cooling apparatus, a mechanism effects the translational movement of the products in a direction perpendicularly to their length, during a sufficient length of time to permit the cooling of the said products. For example, the cooling apparatus can be of a known type comprising mobile racks, that is to say formed essentially of fixed equidistant long members 1 perpendicular to the longitudinal direction of the products and provided with a sawtooth upper configuration, and an assembly of mobile racks 2 which are arranged between the fixed members and are given a rectangular movement so as to convey the products laterally from one indentation of the fixed members 1 to the following indentation. Finally, the mobile racks 2 deposit the products on a lateral plate 3 formed with equidistant grooves 4 in which other racks can slide to make the products slide and bring them in flat groups on to a conveyor, which is given the general reference numeral 5 and is formed of driving rollers such as 6 which transport the group of products towards the shears.

For the reasons indicated hereinbefore, the products displaced laterally on the cooling apparatus are not aligned, particularly at their heads, as shown in FIG. 1 at 7a, 7b . . . 7m.

According to the invention, the heads of the products are aligned by means of a device designated with the general reference numeral 8, which is provided between two fixed sawtooth-top members 1, in the vicinity of the conveyor 5. FIG. 2 shows one form of embodiment of this device. The assembly, supported by a plate 9, comprises a roller 10 driven in rotational movement by a suitable motor 15 and adapted to behave like a rotary electromagnet capable of effecting the translational movement of each product to a position corresponding to head alignment.

More precisely, the roller 10 is advantageously constituted by two adjacent steel masses 10a and 10b connected mechanically but insulated magnetically, for example by a brass separator disc. A coil is accommodated in one of the two masses, for example 10a. According to one feature of the invention it is advantageous to provide at the junction of these two masses a groove 12 which is given a V-section and is intended to receive the products in such a manner that, when the coil is supplied by a suitable electric current, the roller can behave like an electromagnet, the product accommodated in the groove 12 then closing the magnetic field.

The roller 10 is moutned on a shaft 13 supported by bearings 14, 14' and driven by the motor 15, preferably a brake motor, with interposition of a reduction gear 16. The device is supplied with electric current through a connection 17. The assembly is positioned so that the products transported laterally by the racks come to be lodged in the groove 12 of the roller.

The device according to FIG. 2 is advantageously supplemented by idler wheels 18 arranged in such a manner as to support the product engaged in the groove 12 of the roller 10. According to an advantageous form of embodiment (FIG. 3), these wheels are formed by cylindrical rolls which can rotate each about a shaft 19 by means of radial bearings. The shaft 19 rests at its ends on the bottom of notches formed in vertical plates such as 20 themselves connected to the members 1 of the cooling apparatus. In this manner, the assembly and disassembly of the wheels for maintenance purposes is extremely simple. Before the roller 10, it may be convenient to asociate with each wheels 18 an element which permits, if appropriate, the guiding of the end of the product which is displaced longitudinally by the roller 10. Each guide element can be formed of two metal plates 21 and 21' assembled together to form a channel the bottom 22 of which is inclined, and whose cross-section is substantially V-shaped corresponding to the sawtooth shape of the members 1 (FIG. 4).

Furthermore, the aligning of the products displaced longitudinally by the device which has just been described could be effected by means of an abutment. However, it is more advantageous, according to another feature of the invention, to effect the alignment simply by interrupting the supply current for the motor 15 driving the roller 10. For this purpose, there is interposed in the supply circuit of the device a contact 23 which is preferably removable and is operated by the head of the product itself in longitudinal movement. This contact can be a simple plate mounted elastically in such a manner that it interrupts the supply to the motor and the coil only when it is moved downwards by the product.

Under these conditions, operation is as follows: the non-aligned products 7a, 7b, 7m are displaced successively by the mobile racks 2 of the cooling apparatus and are deposited one after the other on the groove 12 of the roller 10 which is driven in rotational movement. As soon as the magnetic circuit is closed by the product, the latter is driven by the said roller and slides on to the idlers 18. When the head of the product reaches the circuit-breaking plate 23, the supply of electrical current to the motor 15 ceases and the magnetic roller 10 is immediately immobilised, magnetisation being discontinued simultaneously. It is then found that the products are all substantially aligned in the same way, as indicated as 7n . . . 7x in FIG. 1.

It will be apparent that the forms of embodiment described have been given more especially by way of example and that many modifications can be made thereto without thereby departing from the framework of the present invention.

We claim:

1. Device for the longitudinal conveyance of elongated products made of ferromagnetic material and for the alignment of the leading ends of said product in the desired position comprising the combination of
 a driving roller, said driving roller including a first roller element, an energizable coil witihn said element whereby said first roller element will form a revolving electromagnet, a second roller element, and a non-magnetic separator interposed between said roller elements, said roller elements having converging, inclined surfaces forming there between a V-groove adapted to receive the products successively wherein, the surfaces being inclined with such an angle that the magnetic circuit between said roller element is closed by contact of the products with said inclined, converging surfaces of the roller element;
 a motor connected to drive said roller; with
 idler wheels aligned longitudinally with said V-groove of said driving roller to support the product in said V-groove for translational movement by said driving roller;
 and a contact means located in the vicinity of the position corresponding to the desired alignment of the leading end of the product and to be actuated by said leading end, said contact means being connected in the circuit of the coil of the electromagnet within said first roller element and to the motor driving said driving roller.

2. Device according to claim 1 including guiding elements located in front of each idler wheel and guiding the leading end of the product in mind with said idler wheel.

References Cited
UNITED STATES PATENTS

| | | | |
|---|---|---|---|
| 1,659,848 | 2/1928 | Wilson. | |
| 1,937,991 | 12/1933 | Stearns | 198—41 |
| 2,588,085 | 3/1952 | Clouse. | |
| 2,873,840 | 2/1959 | Kern et al. | 198—28 |
| 3,135,076 | 6/1964 | Hill. | |

ALLEN N. KNOWLES, Primary Examiner

U.S. Cl. X.R.
198—29, 41; 226—125